United States Patent [19]

Reichelt et al.

[11] Patent Number: 5,791,637
[45] Date of Patent: Aug. 11, 1998

[54] ENERGY ABSORBING COMPRESSION SPRING BODY AND METHOD OF MAKING THE SAME

[75] Inventors: James Kermit Reichelt, Middleburg Heights; Richard Keith Reichelt, Strongsville, both of Ohio

[73] Assignee: Iso Dynamics, Inc., Strongsville, Ohio

[21] Appl. No.: 583,948

[22] Filed: Jan. 11, 1996

[51] Int. Cl.$^6$ ........................................ F16F 1/36
[52] U.S. Cl. .................... 267/141; 267/140; 267/153; 267/292; 114/219; 264/349; 428/543
[58] Field of Search ...................... 267/153, 141, 267/139, 140, 292, 293, 294, 122, 152, 64.27, 220, 141.6, 141.1; 405/215; 293/120, 122, 136, 132, 108; 114/219; 248/634, 635; 524/269; 264/261, 273, 271.1, 265, 325, 258, 349; 29/896.93; 428/158, 543; 156/187, 245

[56] References Cited

U.S. PATENT DOCUMENTS

| | | | |
|---|---|---|---|
| 2,716,566 | 8/1955 | Thiry | 267/153 |
| 3,037,764 | 6/1962 | Paulsen | 267/292 |
| 3,144,247 | 8/1964 | Szonn et al. | 267/141 |
| 3,160,407 | 12/1964 | Vaugoyeau | 267/292 |
| 3,263,985 | 8/1966 | Planta | 267/141.6 |
| 3,305,227 | 2/1967 | Henley | 267/292 |
| 3,315,951 | 4/1967 | Boschi et al. | 267/153 |
| 3,368,806 | 2/1968 | Szonn | 267/292 |
| 3,999,497 | 12/1976 | Hamel | 267/140 |
| 4,258,641 | 3/1981 | Wakamiya | 405/215 |
| 4,319,539 | 3/1982 | Fujii et al. | 267/140 |
| 4,355,792 | 10/1982 | Fukuda et al. | 405/215 |
| 4,515,502 | 5/1985 | Kajigaya et al. | 267/140 |
| 4,601,611 | 7/1986 | Tagomori et al. | 267/140 |
| 4,673,168 | 6/1987 | Warmuth et al. | 267/122 |
| 4,756,266 | 7/1988 | Sakuraoka | 267/140 |
| 5,054,414 | 10/1991 | Yamaguchi | 267/140 |
| 5,326,083 | 7/1994 | Wydra et al. | 267/141.7 |
| 5,458,077 | 10/1995 | Enami et al. | 114/219 |

FOREIGN PATENT DOCUMENTS

| | | | |
|---|---|---|---|
| 0092893 | 11/1983 | European Pat. Off. | 114/219 |
| 158828 | 3/1989 | Japan | 267/153 |
| 4194428 | 7/1992 | Japan | 267/292 |
| 1066745 | 4/1967 | United Kingdom | 267/153 |

*Primary Examiner*—Douglas C. Butler
*Attorney, Agent, or Firm*—Frank C. Manak, III

[57] ABSTRACT

A tubular compression spring body made of a thermoplastic elastomeric material has stepped internal and external wall surfaces that are designed so that when the body is compressed, it absorbs a large amount of the compression energy and has a low rebound force. Also, when compressed again after rebound, the compression spring body exhibits excellent repeatability in its force-displacement performance. In different embodiments, the compression spring body may be designed to exhibit various force-displacement performance curves in order to meet various criteria desired by the user, such as maximum energy absorption and/or minimum rebound force.

8 Claims, 6 Drawing Sheets

ENERGY ABSORBING COMPRESSION SPRING BODY AND METHOD OF MAKING THE SAME

FIELD OF THE INVENTION

This invention relates generally to compression springs and more particularly to tubular elastomeric compression springs that are designed for absorbing shock in vehicle bumper assemblies and other equipment subject to impacts.

BACKGROUND OF THE INVENTION

Tubular compression springs made of thermoplastic elastomeric materials have become very popular in recent years, because of their high energy absorption properties. They have proven to be particularly useful in vehicle bumper assemblies, as well as in other equipment that is subject to sudden impacts or jolts. One favorite material for these compression springs is a copolymer elastomer made by E. I. duPont de Nemours under the trademark Hytrel®. Examples of compression springs made of this material are shown in U.S. Pat. Nos. 4,198,037 and 4,566,678 to Anderson and U.S. Pat. No. 5,326,083 to Wydra et al.

One problem that has limited the kinds of applications for these elastomeric compression springs is the rebound force they have exhibited after the compression force is removed. Technically, these springs have not really absorbed energy. They simply store it temporarily while they remain under compression. When the force that compresses them is released, they "bounce back" or "rebound," directing almost as much energy in the opposite direction as they initially absorbed. Therefore, these elastomeric compression springs have not been used very much in situations where permanent shock absorption is required. Instead, hydraulic shock absorbers and other sophisticated energy absorption devices have been used. Such shock absorbers are very expensive because they employ complicated mechanical dampening devices, such as multiple high-pressure fluid chambers with orifices.

Another problem with elastomeric compression springs has been the tendency of their parts to misalign while under compression. This misalignment can damage the machinery in which they are mounted or cause it to malfunction. Also, repeated misalignment causes the compression springs to wear out prematurely.

Still another problem with thermoplastic elastomeric compression springs has been their inconsistent performance during their initial use. They have often required a break-in period before the elastomer becomes fully set, so that they will perform according to a consistent force-displacement curve. When an elastomeric spring is compressed before it becomes fully set, it will not spring back to the length that it had before it was compressed.

SUMMARY OF THE INVENTION

An object of the present invention is to provide a thermoplastic elastomeric compression spring body that will not only protect machine parts from shocks, but will absorb much of the energy that it receives, thereby reducing or eliminating rebound forces after the compressive forces have been removed.

Another object of the present invention is to provide a thermoplastic elastomeric compression spring that is not prone to misalignment during compression.

Another object of the present invention is to provide a thermoplastic elastomeric compression spring that performs consistently even during its initial use.

These and other objects are accomplished by providing a compression spring body made of a thermoplastic elastomeric material that has a tubular shape with an inside wall surface having a first inside length portion of a relatively large diameter, a second inside length portion of a smaller diameter than the diameter of said first inside length portion and an inside step surface connecting these inside length portions. The compression spring body also has an outside wall surface having a first outside length portion located radially outwardly from the first inside length portion of the inside wall surface and an outside step surface extending inwardly from the first outside length portion and located between the inside step surface and the end portion closest to the second inside length portion of the inside wall surface. When this compression spring body is compressed along its lengthwise axis, the first inside length portion and the inside step surface of the inside wall surface become folded toward one another. The telescoping motion of these parts results in a compression spring body that remains in alignment and permanently absorbs energy and reduces or eliminates rebound forces.

The objects of the present invention are also accomplished by a method of making an energy absorbing compression spring body that comprises the step of making a tubular preform of a thermoplastic elastomeric material with an inside wall surface having a first inside length portion of a relatively large diameter, a second inside wall portion of a smaller diameter than said first inside length portion and an inside step surface connecting said inside length portions. The tubular preform also has an outside length portion of a substantially conical shape with a larger diameter portion of the conical shape being located radially outwardly from said first inside length portion and a smaller diameter portion of the conical shape being located radially outwardly from said second inside length portion. The method also comprises the step of compressing the preform along its lengthwise axis an amount equal to at least 25 percent of its original length, as well as the step of allowing the compressed preform to spring back to a finished shape to form a compression spring body.

Other objects, advantages and features of the present invention will be more apparent from the following detailed description and attached drawings.

DETAILED DESCRIPTION OF THE INVENTION

Figure 1:
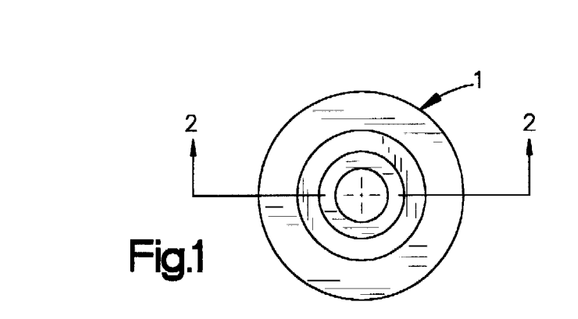
FIG. 1 is a top elevation of a preform for a compression spring body showing one embodiment of the present invention.
Figure 2:
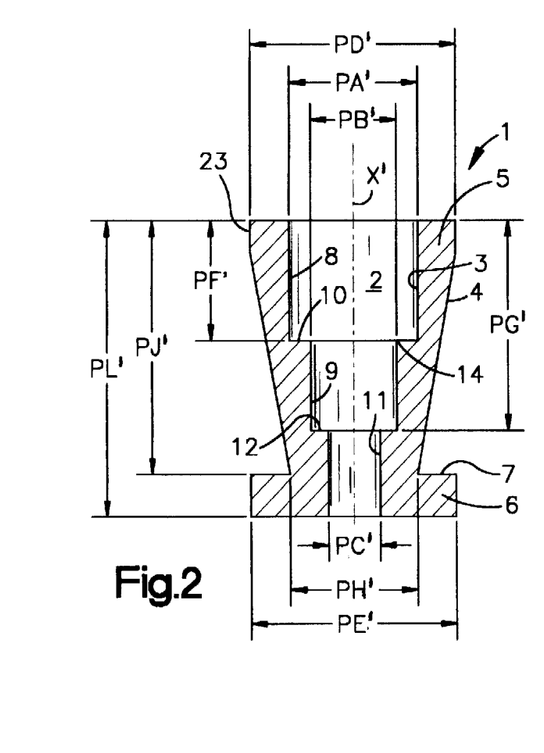
FIG. 2 is a cross-sectional side elevation of the preform of FIG. 1, taken along line II—II of FIG. 1.

One embodiment of the present invention is shown in FIGS. 1 to 4. The compression spring preform 1 shown in FIGS. 1 and 2 is designed to be compressed along a lengthwise axis $X^1$ and then allowed to rebound to form a finished compression spring body 21, shown in FIGS. 3 and 4.

The preform 1 is made of a thermoplastic elastomeric material, preferably one that has excellent energy absorbing properties. The preferred material for this purpose is a copolymer elastomer manufactured by E. I. duPont de Nemours under the trademark Hytrel®. As shown in FIGS. 1 and 2, the preform 1 is made of a 55 durometer Hytrel® elastomer and has a tubular shape with a central hole 2, inside wall surface 3 and outside wall surface 4. The preform 1 is preferably molded in the shape shown in FIG. 2. However, the central hole 2 may be machined to form the inside wall surface 3 after the part has been molded in the form of outside wall surface 4. Alternatively, both the inside and outside wall surfaces may be machined.

The preform 1 has a free end portion 5 and a base portion 6 with a flange 7. The inside wall surface 3 has a first inside length portion 8 of a relatively large diameter $PA^1$ and a second inside length portion 9 of a smaller diameter $PB^1$. An inside step surface 10 connects the inside length portions 8 and 9. Both inside length portions 8 and 9 have cylindrical shapes. In the base portion 6, the inside wall surface 3 has a third inside length portion 11 of a diameter $PC^1$. A second inside step surface 12 connects the inside length portions 9 and 11.

The outside wall surface 4 of the preform 1 has a conical shape with a larger diameter portion 13 located radially outwardly from the first inside length portion 8 and a smaller diameter portion 14 located radially outwardly from the second inside length portion 9.

The preform 1 shown in FIGS. 1 and 2 is made to the following dimensions, according to the labels shown in FIG. 2:

| | | |
|---|---|---|
| $PA^1$ = 0.6875 inch | $PE^1$ = 0.980 inch | $PJ^1$ = 0.870 inch |
| $PB^1$ = 0.500 inch | $PF^1$ = 0.525 inch | $PL^1$ = 1.125 inches |
| $PC^1$ = 0.270 inch | $PG^1$ = 0.815 inch | |
| $PD^1$ = 0.980 inch | $PH^1$ = 0.668 inch | |

Figures 3, 4:
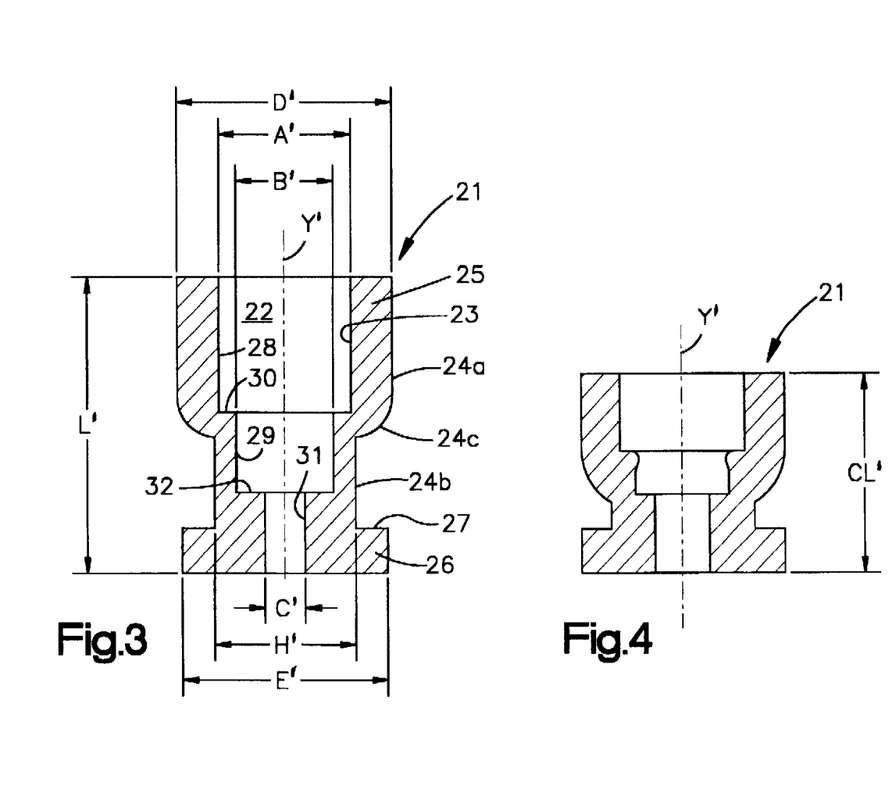
FIG. 3 is a cross-sectional side elevation of a compression spring body made from the preform of FIGS. 1 and 2.
FIG. 4 is a cross-sectional side elevation of the compression spring body of FIG. 3 while the body is in use and in a compressed condition.

To form the finished compression spring body 21 of FIGS. 3 and 4, the preform 1 of FIGS. 1 and 2 is put in a press that applies a compressive force along the axis $X^1$. While in this press, the ends of the preform 1 are held in a fixture so that the preform diameters $PD^1$ and $PE^1$ of 0.980 inch (FIG. 2) remain the same dimension as the diameters $D^1$ and $E^1$ of the spring body 21 (FIG. 3). The force applied by the press is raised to a level sufficient to reduce the axial length of the preform 1 by at least 25 percent. In this case, the initial length $PL^1$ of 1.125 inches is reduced to a length of 0.642 inch, representing a 42.9 percent axial reduction. The force applied by the press is then withdrawn, allowing the preform 1 to spring back part of the distance by which it was compressed, thus forming the finished compression spring body 21 of FIGS. 3 and 4. The compression spring body 21 formed by this process is not only shorter than the preform 1, having a new length $L^1$ of 1.050 inches, but it also has a substantially different shape. The conical outside wall surface 4 of the preform 1 has now become divided into two substantially cylindrical length portions, specifically a large diameter length portion 24a and a small diameter length portion 24b, connected by a rounded outside step surface 24c. The length portion 24a bulges slightly outwardly near the outside step surface 24c, having a diameter $D^4$ of 0.980 inch at the end portion 5 and 1.020 inches near the step surface 24c. Also, the first inside length portion 8 of the preform 1 has been formed into an inside length portion 28 that is coned slightly inwardly at the top, so that its original diameter $PA^1$ of 0.6875 inch has a finished diameter $A^1$ of 0.675 inch. The compression spring body 21 has the following dimensions:

| | | |
|---|---|---|
| $A^1$ = 0.675 inch | $D^1$ = 0.980 inch to | $H^1$ = 0.698 inch |
| $B^1$ = 0.480 inch | 1.020 inch | $L^1$ = 1.050 inches |
| $C^1$ = 0.270 inch | $E^1$ = 0.980 inch. | |

The compression spring body 21 has a third inside wall surface 31 and a second inside step surface 32 that are designed to hold a bolt or other fastening member. Such a fastening member can be used to secure the compression spring to another machine part.

Figure 5:
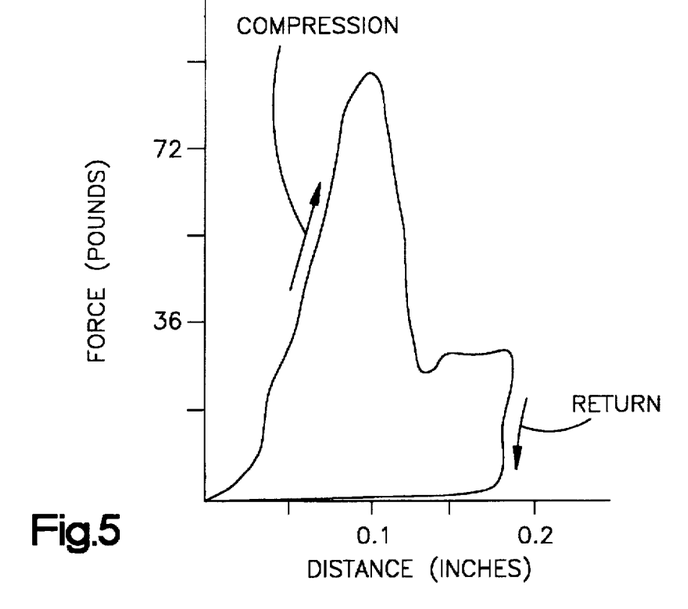
FIG. 5 is a graph showing the force-displacement performance of the compression spring body of FIGS. 3 and 4.

FIG. 4 shows the shape of the compression spring body 21 when compressed in a 30-ton press exerting a force of approximately 90 pounds. The graph of FIG. 5 shows the force-displacement characteristics of the spring body 21. The curve of this graph, as well as the curves of FIGS. 10, 15 and 20, was generated while the press was moving at 40 in./min., using electric displacement and force sensors with proportional voltage outputs.

The main advantage of the spring body 21 is that it absorbs all of the energy that is applied to it and exerts no rebound force after the compressive force is released. In fact, after the body 21 has been compressed by about 0.1 inch under a force of 90 pounds, it collapses another 0.088 inch to a length $CL^1$ of 0.862 inch (FIG. 4), as long as the force applied to it remains only slightly above 30 pounds. The body 21 may remain in this compressed state for as long as several hours, after which it springs back to its original shape of FIG. 3.

The body 21 may be further compressed to a length $CL^1$ shorter than 0.862 inch. However, a substantially higher force would be needed and some rebound force would be experienced when this high compression force is released.

The compression spring body 21 remains in very good alignment during the compression stroke, because its top portion folds over its bottom portion like the sections of a telescope.

The compression spring body 21 has a relatively short compression stroke, but this compression stroke may be lengthened by using several spring bodies 21 in tandem.

Another embodiment of the present invention is illustrated by the compression spring preform 101 and spring body 121, shown in FIGS. 6 through 9. The spring body 121 exhibits a small amount of rebound force, but has the advantage of moving back to its original shape immediately after the compression force on it is released. Also, the spring body 121 has a longer compression stroke than the spring body 21 of FIGS. 3 and 4.

Figure 7:
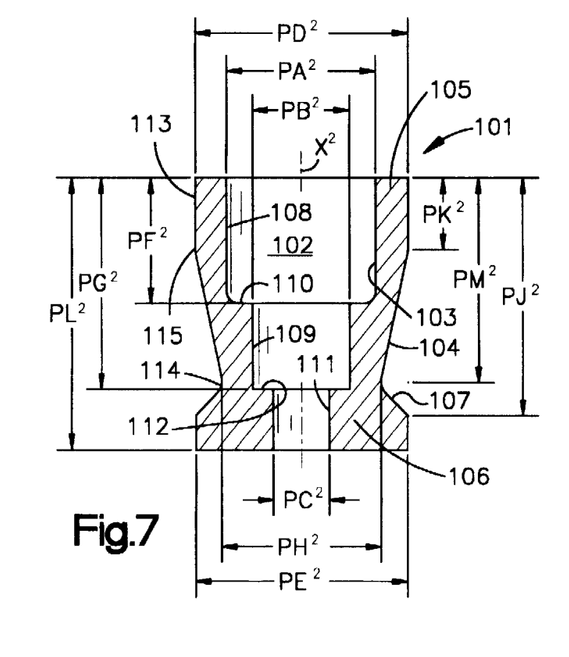
FIG. 7 is a cross-sectional side elevation of the preform of FIG. 6, taken along line VII—VII of FIG. 6.

Referring to FIG. 7, the preform 101 is made of a 40 durometer Hytrel® elastomer and has a tubular shape with a central hole 102, inside wall surface 103, outside wall surface 104, a free end portion 105 and a base portion 106 with a tapered flange 107. The inside wall surface 103 has a first inside length portion 108 of a relatively large diameter $PA^2$ and a second inside length portion 109 of a smaller diameter $PB^2$. An inside step surface 110 connects the inside length portions 108 and 109. Both inside length portions 108 and 109 have cylindrical shapes. In the base portion 106, the inside wall surface 103 has a third inside length portion 111 of a diameter $PC^2$. A second inside step surface 112 connects the inside length portions 109 and 111.

The outside wall surface 104 of the preform 1 has a generally conical shape, but it also has a short cylindrical portion 113 near its free end portion 105. The smallest diameter of the outside wall surface is at the neck 114. The outside wall surface 104 is conical between the neck 114 and the bottom edge 115 of the cylindrical portion 113.

Figure 6:
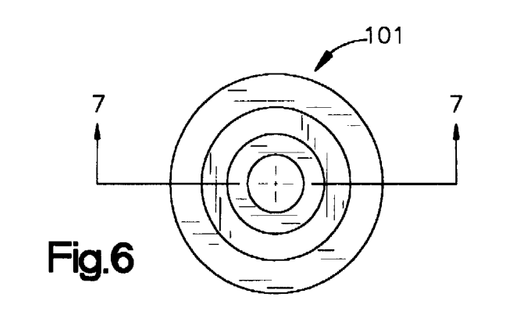
FIG. 6 is a top elevation of a preform for a compression spring body showing a second embodiment of the present invention.

The preform 101 shown in FIGS. 6 and 7 is made to the following dimensions, according to the labels shown in FIG. 7:

| | | |
|---|---|---|
| $PA^2 = 0.6875$ inch | $PE^2 = 0.994$ inch | $PJ^2 = 1.000$ inch |
| $PB^2 = 0.468$ inch | $PF^2 = 0.650$ inch | $PK^2 = 0.335$ inch |
| $PC^2 = 0.270$ inch | $PG^2 = 0.910$ inch | $PL^2 = 1.125$ inches |
| $PD^2 = 0.994$ inch | $PH^2 = 0.710$ inch | $PM^2 = 0.865$ inch |

Figure 8:
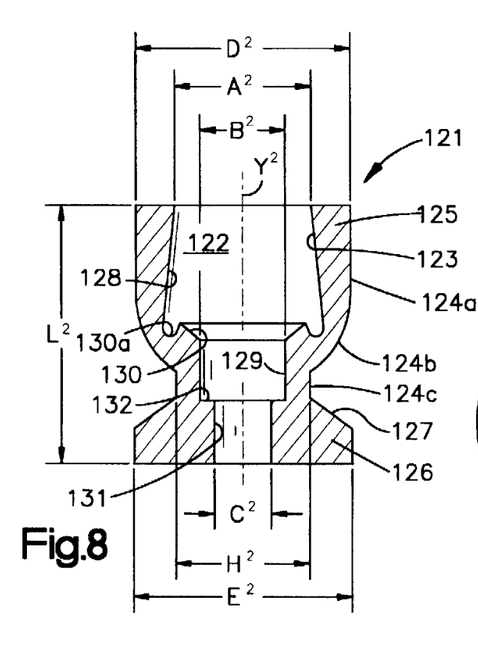
FIG. 8 is a cross-sectional side elevation of a compression spring body made from the preform of FIGS. 6 and 7.
Figure 9:
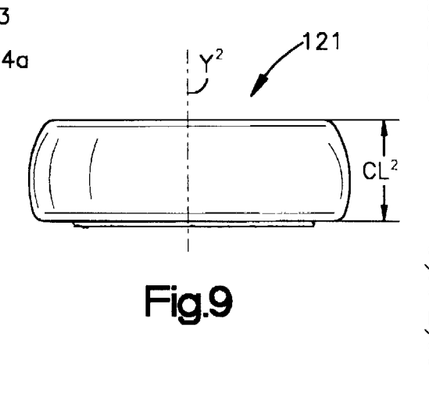
FIG. 9 is a side elevation of the compression spring body of FIG. 8 while the body is in use and in a compressed condition.

To form the finished compression spring body 121 of FIGS. 8 and 9, the preform 101 is put in a press and its ends are held in a fixture to prevent their expansion. The press compresses the preform 101 from a initial axial length $PL^2$ of 1.125 inches to 0.642 inch, representing a 42.9 percent axial reduction. The force applied by the press is then withdrawn, allowing the preform 101 to spring back part of the distance by which it was compressed, thus forming the finished compression spring body 121 of FIGS. 8 and 9. The compression spring body 121 formed by this process has a length $L^2$ of 1.040 inches. Its outside wall surface has a large diameter length portion 124a and a small diameter length portion 124c, connected by a rounded outside step surface 124b. The large diameter length portion 124a expands slightly outwardly after being released from the fixture, from a diameter $PD^2$ of 0.994 inch (FIG. 7) to a diameter $D^2$ of 1.020 inch (FIG. 8). On the other hand, the inside length portion 128 is coned inwardly at the top. Also, the inside step surface 130 is coned outwardly in the opposite direction and has a rounded channel 130a where it meets the inside length portion 128. The inside length portions 129 and 131 are substantially cylindrical. The compression spring body 121 has the following dimensions:

| | | |
|---|---|---|
| $A^2 = 0.656$ inch | $D^2 = 1.020$ inches | $H^2 = 0.742$ inch |
| $B^2 = 0.468$ inch | $E^2 = 0.994$ inch | $L^2 = 1.040$ inches |
| $C^2 = 0.270$ inch | | |

Figure 10:
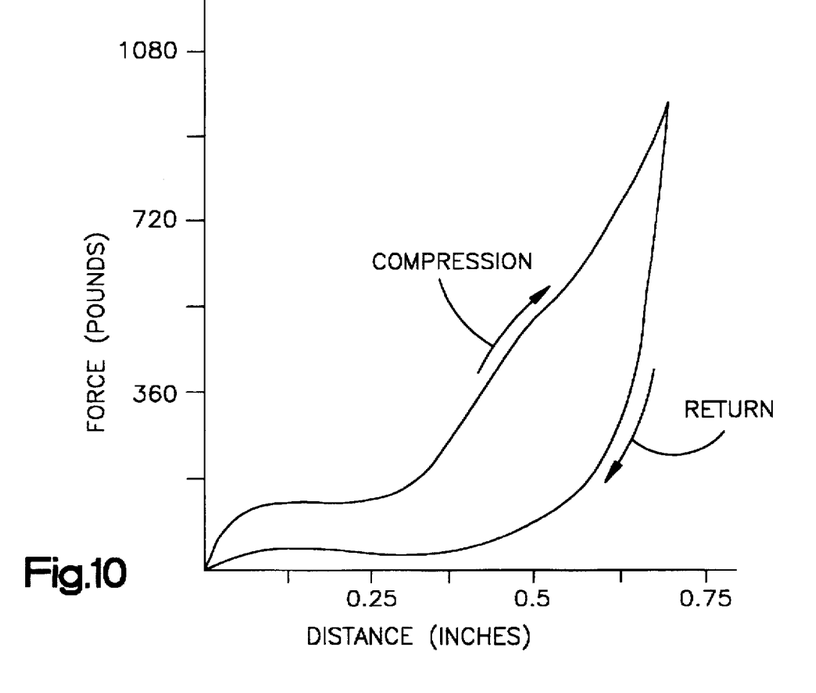
FIG. 10 is a graph showing the force-displacement performance of the compression spring body of FIGS. 8 and 9.
Figure 11:
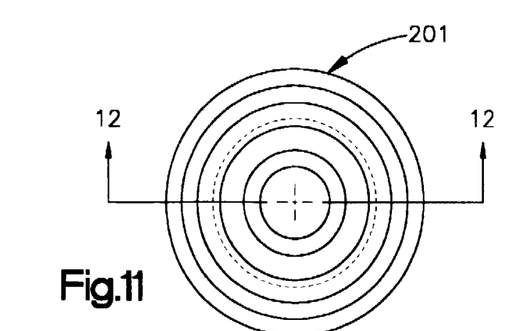
FIG. 11 is a top elevation of a preform for a compression spring body showing a third embodiment of the present invention.

FIG. 9 shows the shape of the compression spring body 121 when compressed in the 30-ton press exerting a force of approximately 960 pounds. The graph of FIG. 10 shows the force-displacement performance of the spring body 121 during this compression. The main advantage of the spring body 121 is that it absorbs a large amount energy when compressed but gives back very little rebound energy when the compressive force is removed. It also has a relatively long compressive stroke, collapsing a distance of about 0.7 inch to a length $CL^2$ of only 0.34 inch, as shown in FIG. 9.

Like the spring body 21, the compression spring body 121 remains in very good alignment during the compression stroke, because its top portion folds over its bottom portion like sections of a telescope.

Another embodiment of the present invention is illustrated by the compression spring preform 201 and spring body 221, shown in FIGS. 11 through 14. The preform 201 is made of a 55 durometer Hytrel® elastomer and has a tubular shape with a central hole 202, inside wall surface 203, outside wall surface 204, a free end portion 205 and a base portion 206 with a rounded flange 207. The inside wall surface 203 has a first inside length portion 208 of a relatively large diameter $PA^3$ and a second inside length portion 209 of a smaller diameter $PB^3$. An inside step surface 210 connects the inside length portions 208 and 209. Both inside length portions 208 and 209 have cylindrical shapes. In the base portion 206, the inside wall surface 203 has a third inside length portion 211 of a diameter $PC^3$. A second inside step surface 212 connects the inside length portions 209 and 211.

Figure 12:
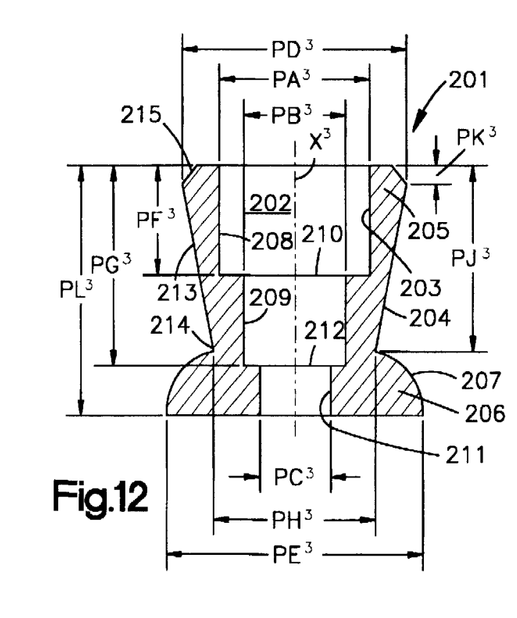
FIG. 12 is a cross-sectional side elevation of the preform of FIG. 11, taken along line XII—XII of FIG. 11.

The outside wall surface 204 of the preform 201 has a conical portion 213, located between a small diameter neck portion 214 and a large diameter beveled corner portion 215. The preform 201 is made to the following dimensions, according to the labels shown in FIG. 12:

| | | |
|---|---|---|
| $PA^3 = 0.750$ inch | $PE^3 = 1.222$ inches | $PJ^3 = 0.800$ inch |
| $PB^3 = 0.562$ inch | $PF^3 = 0.532$ inch | $PL^3 = 1.090$ inches |
| $PC^3 = 0.391$ inch | $PG^3 = 0.880$ inch | |
| $PD^3 = 1.150$ inch | $PH^3 = 0.884$ inch | |

Figure 13:
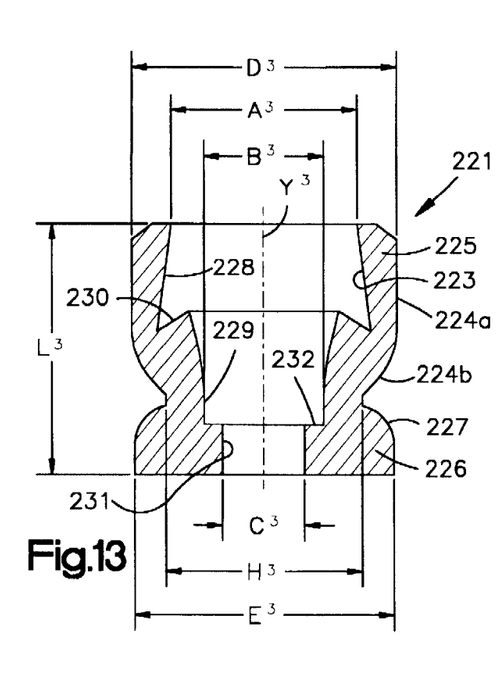
FIG. 13 is a cross-sectional side elevation of a compression spring body made from the preform of FIGS. 11 and 12.
Figure 14:
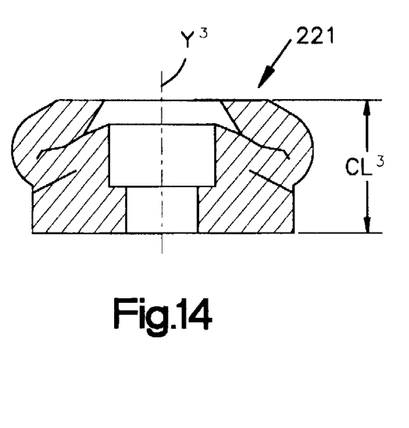
FIG. 14 is a cross-sectional side elevation of the compression spring body of FIG. 13 while the body is in use and in a compressed condition.

To form the finished compression spring body 221 of FIGS. 13 and 14, the preform 201 is put in a press and its axial length is reduced from its initial length $PL^3$ of 1.090 inches to a length of 0.545 inch, representing a 50.0 percent axial reduction. In this case, no fixture is used to control the end diameters of the product. When the force applied by the press is withdrawn, the preform 201 springs back part of the distance by which it was compressed, thus forming the finished compression spring body 221. The compression spring body 221 formed by this process has a length $L^3$ of 0.975 inch. Its outside wall surface has a length portion 224a and a conical portion 224b. The inside length portion 228 is coned inwardly at the top and the inside step surface 230 is coned inwardly in the same direction. The inside length portion 229 is cylindrical near the inside step surface 232 but flares outwardly near its junction with the inside step surface 230. The compression spring body 221 has the following dimensions:

| | | |
|---|---|---|
| $A^3 = 0.700$ inch | $D^3 = 1.210$ inches | $H^3 = 0.898$ inch |
| $B^3 = 0.562$ inch | $E^3 = 1.222$ inches | $L^3 = 0.980$ inch |
| $C^3 = 0.391$ inch | | |

Figure 15:
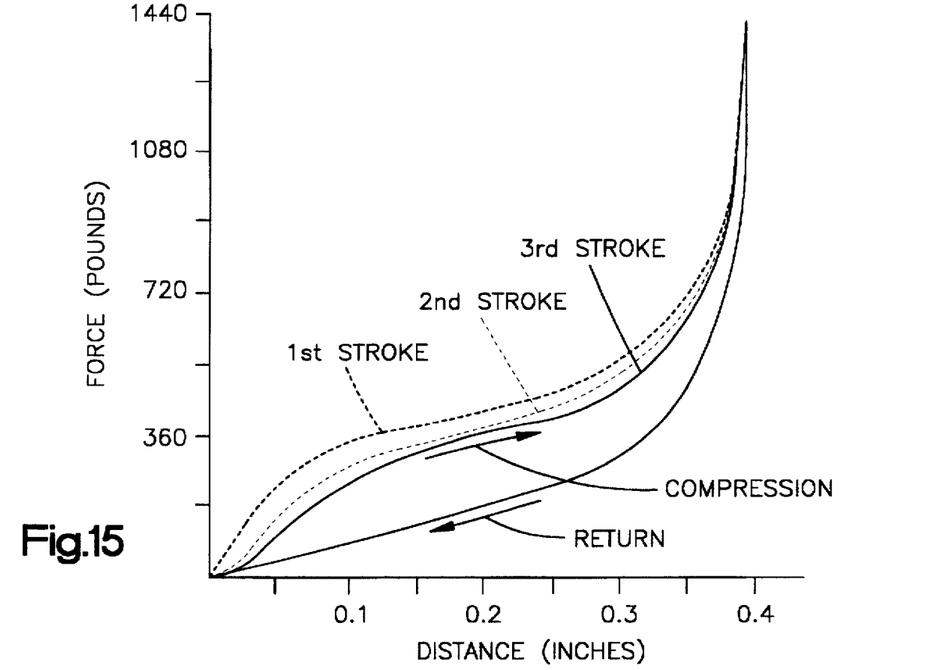
FIG. 15 is a graph showing the force-displacement performance of the compression spring body of FIGS. 13 and 14, when subjected to first, second and third compressive strokes after being manufactured.
Figure 16:
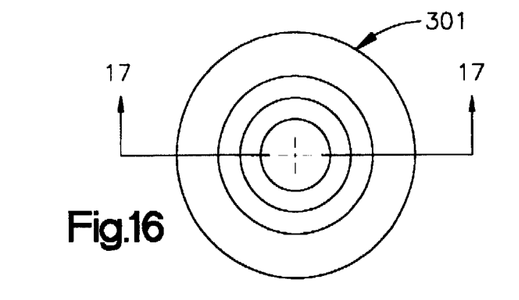
FIG. 16 is a top elevation of a preform for a compression spring body showing a fourth embodiment of the present invention.

FIG. 14 shows the shape of the compression spring body 221 when compressed by the 30-ton press exerting a force of approximately 1400 pounds. The length $CL^3$ of the compressed body 221 is approximately 0.6 inch. The graph of FIG. 15 shows the force-displacement performance of the spring body 221 during compression. The main advantage of the spring body 221 is that it absorbs a very large amount energy when compressed and remains in good alignment during the compressive stroke, due to its compact folding action as the inner length portion 223 closes against the inner step portion 230.

Another advantage of the compression spring body 221 is the excellent repeatability of its force-displacement performance during its initial compression strokes after manufacture. FIG. 15 shows the three compression curves for the body 221 during its first three strokes after manufacture. There is only one curve for the rebound portions of the strokes, because those portions are nearly identical. The three compression curves show that the body 221 loses only a small amount of stiffness between the first and second strokes and an even smaller amount of stiffness between the second and third strokes. Therefore, the compression spring body 221 requires substantially no break-in period.

Another embodiment of the present invention is illustrated by the compression spring preform 301 and spring body 321, shown in FIGS. 16 through 19. The preform 301 is made of a 55 durometer Hytrel® elastomer and has a tubular shape with a central hole 302, inside wall surface 303, outside wall surface 304, a free end portion 305 and a base portion 306 with a flange 307. The inside wall surface 303 has a first inside length portion 308 of a relatively large diameter $PA^4$ and a second inside length portion 309 of a smaller diameter $PB^4$. An inside step surface 310 connects the inside length portions 308 and 309. Both inside length portions 308 and 309 have cylindrical shapes. In the base portion 306, the inside wall surface 303 has a third inside length portion 311 of a diameter $PC^4$. A second inside step surface 312 connects the inside length portions 309 and 311.

Figure 17:
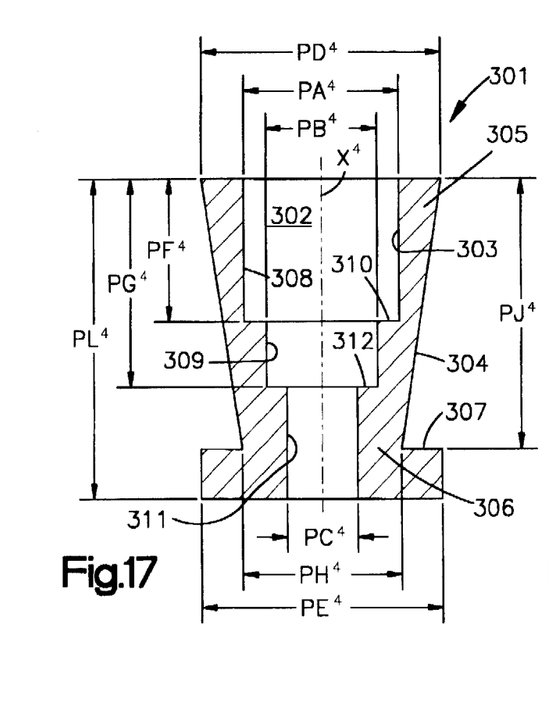
FIG. 17 is a cross-sectional side elevation of the preform of FIG. 16, taken along line XVII—XVII of FIG. 16.

The outside wall surface 304 of the preform 301 has a conical shape, with a larger diameter portion being located radially outwardly of the first inside length portion 308 and a smaller diameter portion being located radially outwardly of the second inside length portion 309. The preform 301 is made to the following dimensions, according to the labels shown in FIG. 17:

| | | |
|---|---|---|
| $PA^4 = 0.625$ inch | $PE^4 = 0.998$ inch | $PJ^4 = 1.010$ inches |
| $PB^4 = 0.437$ inch | $PF^4 = 0.494$ inch | $PL^4 = 1.195$ inches |
| $PC^4 = 0.275$ inch | $PG^4 = 0.810$ inch | |
| $PD^4 = 0.998$ inch | $PH^4 = 0.640$ inch | |

Figure 18:
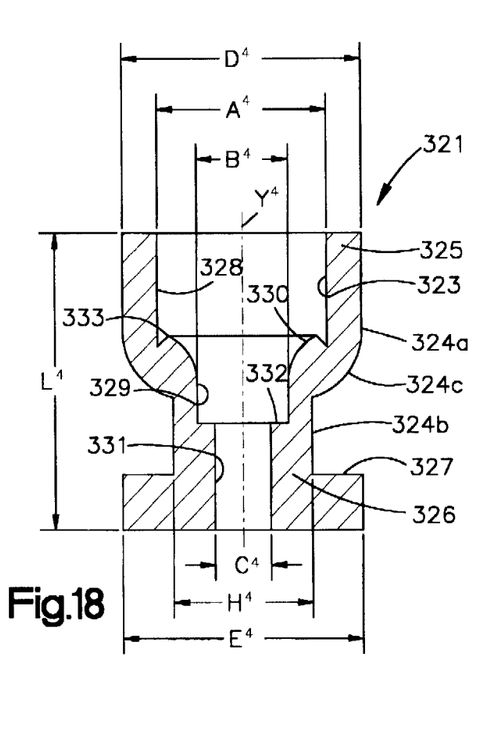
FIG. 18 is a cross-sectional side elevation of a compression spring body made from the preform of FIGS. 16 and 17.
Figure 19:
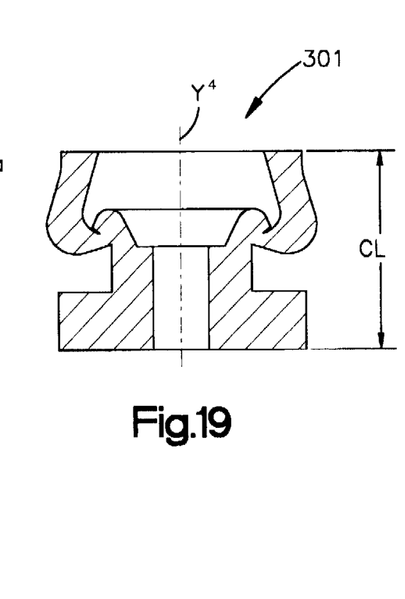
FIG. 19 is a cross-sectional side elevation of the compression spring body of FIG. 18 while the body is in use and in a compressed condition.

To form the finished compression spring body 321 of FIGS. 18 and 19, the preform 301 is put in a press and its end surfaces are held in a fixture to prevent their expansion during compression. The press reduces the axial length of the preform 301 from its initial length $PL^4$ of 1.195 inches to a length of 0.642 inch, representing a 46.3 percent axial reduction. The force applied by the press is then withdrawn, allowing the preform 301 to spring back part of the distance by which it was compressed, thus forming the finished compression spring body 321. The compression spring body 321 formed by this process has a length $L^4$ of 1.085 inches. Its outside wall surface has length portions 324a and 324b that are substantially cylindrical and a rounded outside step surface 324c. The length portion 324a expands slightly after it is released from the fixture. It also bulges slightly outwardly near the outside step surface 324c, so that the diameter $D^4$ increases from 1.020 inch at the end portion 325 to 1.040 inch at near the step surface 324c. Also, the length portion 324b bulges slightly outwardly near the flange 327, so that the diameter $H^4$ increases from 0.622 inch near the step surface 324c to 0.640 inch at the junction with the flange 327. The inside length portion 328 is coned slightly inwardly at the top. The inside length portion 329 is cylindrical near the inside step surface 332 and merges into a rounded inside step surface 330. The step surface 330 has a small groove 333 where it joins the inside length portion 328. The compression spring body 321 has the following dimensions:

| | | |
|---|---|---|
| $A^4 = 0.656$ inch | $D^4 = 1.020$ inches | $H^4 = 0.622$ inch to |
| $B^4 = 0.425$ inch | to 1.040 inches | 0.640 inch |
| $C^4 = 0.275$ inch | $E^4 = 0.998$ inch | $L^4 = 1.100$ inches |

Figure 20:
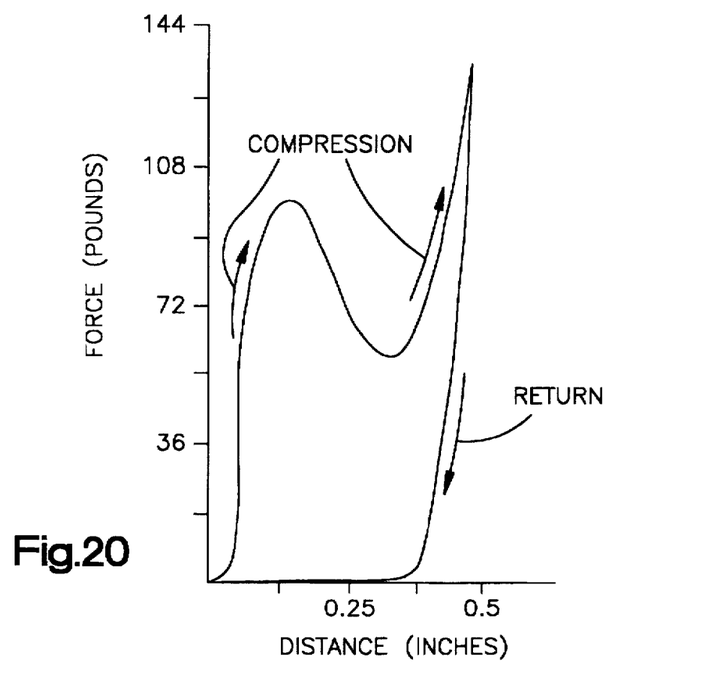
FIG. 20 is a graph showing the force-displacement performance of the compression spring body of FIGS. 18 and 19.

FIG. 19 shows the shape of the compression spring body 321 when compressed in the 30-ton press exerting a force of approximately 135 pounds. The graph of FIG. 20 shows the force-displacement performance of the spring body 321. The main advantage of the spring body 321 is that it absorbs substantially all of the energy that is applied to it and exerts substantially no rebound force after the compressive force is released. As the curve of FIG. 20 shows, after the body 321 has been compressed by about 0.125 inch under a force of about 100 pounds, it collapses another 0.20 inch as long as the remaining force is above 60 pounds. Then, a force of about 135 pounds is required to reduce the body 321 to a length $CL^4$ of about 0.60 inch, shown in FIG. 19. When the compression force is released, the compression spring body 321 may remain in its compressed condition of FIG. 19 for as long as several minutes. For that time interval or perhaps immediately upon removal of the compression force, the body 321 will return to its original shape of FIG. 18. During this return, the body 321 will exert little or no rebound force.

The compression spring body 321 remains in very good alignment during the compression stroke, because its top portion folds over its bottom portion like the sections of a telescope. Also, the spring body 321 exhibits excellent repeatability of its force-displacement performance, thus reducing inconsistent stopping forces during successive compression strokes. The spring body 321 requires substantially no break-in period.

The forgoing embodiments of the present invention show that a tubular thermoplastic elastomeric compression spring body can be made to exhibit a variety of force-displacement performance curves, by the appropriate shaping of its inside and outside wall surfaces. Using the techniques shown in these embodiments, these compression spring bodies can be made to absorb large amounts of energy while producing little or no rebound force. Also, the bodies can be made so that they are less likely to become misaligned when they are compressed and also so that they repeat the same force-displacement curve consistently during successive compressive strokes.

While several embodiments of the present invention have been shown and described, other embodiments, modifications and additions will of course be apparent to those skilled in the art, while remaining within the scope of the appended claims.

We claim:

1. An energy absorbing compression spring body made of a thermoplastic elastomeric material, said body having a tubular shape with inside and outside wall surfaces and end portions between which the body is designed to be compressed along a lengthwise axis, wherein the improvement comprises:

means to reduce the rebound force, the misalignment tendency and the initial break-in period of said compression spring body including, (a) said inside wall surface having a first inside length portion of a relatively large diameter, a second inside length portion of a smaller diameter than the diameter of said first inside length portion and an inside step surface connecting said inside length portions of said inside wall surface; and (b) said outside wall surface having a first outside length portion located radially outwardly from the first inside length portion of said inside wall surface and an outside step surface extending inwardly from said first outside length portion and located along said lengthwise axis between said inside step surface and the end portion closest to said second inside length portion of said inside wall surface;

whereby, when the compression spring body is compressed along said lengthwise axis, said first inside length portion and said inside step surface of said inside wall surface become folded toward one another.

2. An energy absorbing compression spring body according to claim 1 wherein the improvement also comprises:

(c) said first and second inside length portions of said inside wall surface and said first length portion of said outside wall surface being substantially cylindrical;

(d) said inside step surface extending in a substantially radial direction in respect of said lengthwise axis; and (e) a substantially cylindrical second outside length portion of said outside wall surface having a smaller diameter than said first outside length portion, said second outside length portion extending from said outside step surface and being located radially outwardly from said second inside length portion.

3. An energy absorbing compression spring body according to claim 1 wherein the improvement also comprises:

(c) said second inside length portion of said inside wall surface and said first length portion of said outside wall surface being substantially cylindrical;

(d) said first inside length portion of said inside wall surface being substantially conical and having its largest diameter at its end nearest said inside step surface;

(e) said inside step surface having a recessed portion adjacent said first inside length portion; and (f) a substantially cylindrical second outside length portion of said outside wall surface having a smaller diameter than said first outside length portion, said second outside length portion extending from said outside step surface and being located radially outwardly from said second inside length portion.

4. An energy absorbing compression spring body according to claim 1 wherein the improvement also comprises:

(c) said first outside length portion of said outside wall surface being substantially cylindrical;

(d) said first inside length portion of said inside wall surface being substantially conical and having its largest diameter at its end nearest said inside step surface;

(e) said inside step surface being substantially conical, having its largest diameter at its end nearest said first inside length portion and extending lengthwise of said body from said largest diameter end in the same direction as said first inside length portion; and (f) said second inside length portion of said inside wall surface being substantially conical and having its largest diameter at its end nearest said inside step surface.

5. An energy absorbing compression spring body according to claim 1 wherein the improvement also comprises:

(c) the end portion of said body nearest the second outside and second inside length portions being a base portion having a third outside length portion of said outside wall surface that is of larger diameter than the diameter of said second outside length portion and also a third inside length portion of said inside wall surface of a smaller diameter than the diameter of said second inside length portion; and (d) a second inside step surface connecting said second inside length surface to said third inside wall surface, said second inside step surface being designed to engage a fastening member for securing said compression spring body to another machine part.

6. A preform for an energy absorbing compression spring body made of a thermoplastic elastomeric material, said preform having a tubular shape with inside and outside wall surfaces and end portions between which the preform is designed to be compressed along a lengthwise axis, wherein the improvement comprises:

means to reduce the rebound force, the misalignment tendency and the initial break-in period of said compression spring body including, (a) said inside wall surface having a first inside length portion of a relatively large diameter, a second inside length portion of a smaller diameter than the diameter of said first inside length portion and an inside step surface connecting said inside length portions of said inside wall surface; and (b) said outside wall surface having a substantially conical shape with a larger diameter portion being located radially outwardly from said first inside length portion and a smaller diameter portion being located radially outwardly from said second inside length portion.

7. A preform for an energy absorbing compression spring body according to claim 6 wherein the improvement also comprises:

(c) the end portion of said preform nearest the second outside and second inside length portions being a base portion having a third outside length portion of said outside wall surface that is of larger diameter than the diameter of said second outside length portion and also a third inside length portion of said inside wall surface of a smaller diameter than the diameter of said second inside length portion; and (d) a second inside step surface connecting said second inside length surface to said third inside wall surface.

8. A method of making an energy absorbing compression spring body of a thermoplastic material comprising the steps of:

(a) making a tubular preform of a thermoplastic elastomeric material with an inside wall surface having a first inside length portion of a relatively large diameter, a second inside wall portion of a smaller diameter than said first inside length portion and an inside step surface connecting said inside length portions, said tubular preform also having an outside length portion of a substantially conical shape with a larger diameter portion of said conical shape being located radially outwardly from said first inside length portion and a smaller diameter portion of said conical shape being located radially outwardly from said second inside length portion;

(b) compressing said preform along its lengthwise axis an amount equal to at least 25 percent of the original length of the preform; and (c) allowing the compressed preform to spring back to a finished shape to form a compression spring body;

so as to produce a compression spring body of a thermoplastic material having a reduced rebound force, misalignment tendency and initial break-in period.

* * * * *